(12) United States Patent
Nakata et al.

(10) Patent No.: US 9,544,483 B2
(45) Date of Patent: Jan. 10, 2017

(54) CONTROLLING COMMUNICATIONS IN A CAMERA SYSTEM INCLUDING A CAMERA BODY AND AN INTERCHANGEABLE LENS

(71) Applicant: Olympus Corporation, Hachioji-shi, Tokyo (JP)

(72) Inventors: Koichi Nakata, Tokyo (JP); Kazuhiro Kumazawa, Tokyo (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 14/643,517

(22) Filed: Mar. 10, 2015

(65) Prior Publication Data

US 2015/0281534 A1 Oct. 1, 2015

(30) Foreign Application Priority Data

Mar. 25, 2014 (JP) ................. 2014-062562

(51) Int. Cl.
| | |
|---|---|
| H04N 5/232 | (2006.01) |
| H04N 5/225 | (2006.01) |
| G03B 13/34 | (2006.01) |
| G03B 17/14 | (2006.01) |
| H04N 5/238 | (2006.01) |
| G03B 3/10 | (2006.01) |
| G03B 5/00 | (2006.01) |

(52) U.S. Cl.
CPC ............. *H04N 5/2254* (2013.01); *G03B 3/10* (2013.01); *G03B 5/00* (2013.01); *G03B 13/34* (2013.01); *G03B 17/14* (2013.01); *H04N 5/2252* (2013.01); *H04N 5/238* (2013.01); *H04N 5/23209* (2013.01); *H04N 5/23212* (2013.01); *H04N 5/23296* (2013.01); *G03B 2205/0046* (2013.01); *G03B 2206/00* (2013.01)

(58) Field of Classification Search
CPC ................ H04N 5/2254; H04N 5/2252; H04N 5/23209; H04N 5/23212; H04N 5/23296; H04N 5/238; G03B 13/34; G03B 17/14

See application file for complete search history.

(56) References Cited

U.S. PATENT DOCUMENTS

| | | | | |
|---|---|---|---|---|
| 8,616,790 B2 * | 12/2013 | Osawa | ............... | G03B 17/14 396/529 |
| 9,052,569 B2 * | 6/2015 | Nakata | ............... | G03B 3/10 |
| 9,172,523 B2 * | 10/2015 | Okada | ............... | G03B 17/14 |

(Continued)

FOREIGN PATENT DOCUMENTS

JP 2009-258718 11/2009

*Primary Examiner* — Nicholas Giles
(74) *Attorney, Agent, or Firm* — John C. Pokotylo; Straub & Pokotylo

(57) ABSTRACT

In a camera system, a lens CPU controls the operation of an interchangeable lens at a control instruction from a camera body. In the camera body, a subject formed on an imaging element by using the interchangeable lens is photographed at a specified frame rate and image data is generated. A camera body communication circuit transmits a timing signal in accordance with the frame rate to the lens CPU through a main body CPU. The main body CPU acquires lens characteristic data stored in non-volatile memory by a communication with the lens CPU, determines the transmission period of the timing signal according to the acquired lens characteristic data, and controls the camera body communication circuit on the basis of the determined transmission period.

3 Claims, 7 Drawing Sheets

(56) References Cited

U.S. PATENT DOCUMENTS

| | | | |
|---|---|---|---|
| 2009/0245778 A1 | 10/2009 | Shibuno | |
| 2011/0170853 A1* | 7/2011 | Osawa | G03B 17/14 396/529 |
| 2012/0155853 A1* | 6/2012 | Osawa | G03B 17/14 396/529 |
| 2012/0183285 A1 | 7/2012 | Shibuno | |
| 2012/0328277 A1* | 12/2012 | Nakata | G03B 3/10 396/131 |
| 2013/0141609 A1* | 6/2013 | Watazawa | H04N 5/225 348/222.1 |
| 2013/0329118 A1* | 12/2013 | Hongu | H04N 5/23209 348/345 |
| 2015/0085177 A1* | 3/2015 | Okada | G03B 17/14 348/345 |
| 2016/0014325 A1* | 1/2016 | Okada | G03B 17/14 348/335 |

* cited by examiner

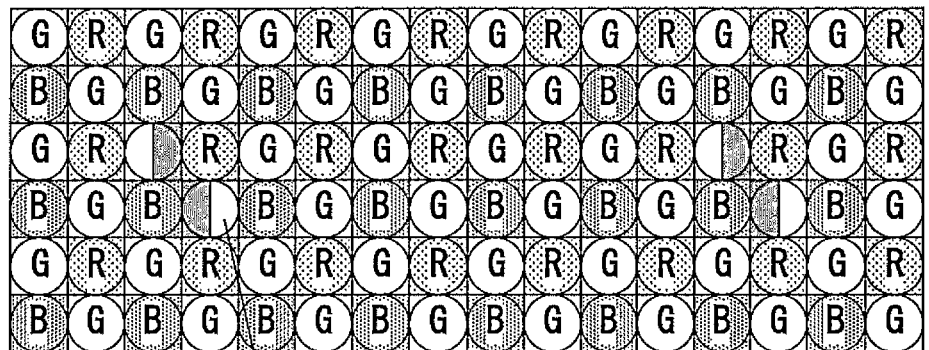
FOCUS DETECTION PIXEL
PHOTORECEPTION UNIT 150
F I G. 5

| COMMUNICATION PROHIBITED PERIOD DATA | COMMUNICATION PROHIBITED PERIOD RANGE |
|---|---|
| 0x00 | SMALLER THAN 0.5 mS |
| 0x01 | NOT LESS THAN 0.5 mS, SMALLER THAN 1.0 mS |
| 0x10 | NOT LESS THAN 1.0 mS, SMALLER THAN 1.5 mS |
| 0x11 | NOT LESS THAN 1.5 mS |

FIG. 7

CONTROLLING COMMUNICATIONS IN A CAMERA SYSTEM INCLUDING A CAMERA BODY AND AN INTERCHANGEABLE LENS

CROSS REFERENCE TO RELATED APPLICATION

This application is based upon and claims the benefit of priority of the prior Japanese Patent Application No. 2014-062562, filed on Mar. 25, 2014, the entire contents of which are incorporated herein by reference.

BACKGROUND OF THE INVENTION

1. Field of the Invention

The present invention is related to a synchronous communication between a lens of a lens interchangeable camera system and a camera body, and more specifically to a synchronous communication performed when a lens operation is controlled.

2. Description of the Related Art

As one of the auto-focus control methods in photography, a method using a vertical synchronizing signal of an imaging element is proposed in Japanese Laid-open Patent Publication No. 2009-258718. In practice, a synchronous communication is performed by transmitting a synchronization signal having the period of or an integer multiple period of a vertical synchronizing signal from a camera body to an interchangeable lens to start and stop driving of a focusing lens in synchronization with the synchronization signal or to change the driving speed and method, thereby controlling the driving of a focusing lens in autofocusing.

SUMMARY OF THE INVENTION

The present invention aims at providing a camera system capable of performing control at the optimum frame rate and synchronous communication period in accordance with the characteristic of an interchangeable lens attached to a camera body.

According to an aspect of the present invention, a camera system has an interchangeable lens and a camera body from which the interchangeable lens can be removed. The interchangeable lens includes: a storage unit which stores data relating to a communication operation between the interchangeable lens and the camera body; and a lens control unit which communicates with the camera body and controls an operation of the interchangeable lens at a control instruction from the camera body. The camera body includes: an imaging unit which photographs a subject on an imaging element by using the interchangeable lens at a specified frame rate and generates image data; a body control unit which communicates with the lens control unit and controls an operation of the camera body; and a timing signal transmission unit which transmits a timing signal at the frame rate to the lens control unit through the body control unit. The body control unit acquires data relating to a communication operation stored in the storage unit via the communication with the lens control unit, determines the transmission period of the timing signal according to the acquired data, and controls the timing signal transmission unit on the basis of the determined transmission period.

BRIEF DESCRIPTION OF THE DRAWINGS

The present invention will be more apparent from the following detailed description when the accompanying drawings are referenced.

FIG. 5 is an explanatory view of an autofocusing system used in the first variation example;

FIG. 7 is an example of the data structure of the communication prohibited period in the lens data according to the second variation example.

DESCRIPTION OF THE PREFERRED EMBODIMENTS

The embodiments of the present invention are described below in detail with reference to the attached drawings.

First Embodiment

Figure 1:
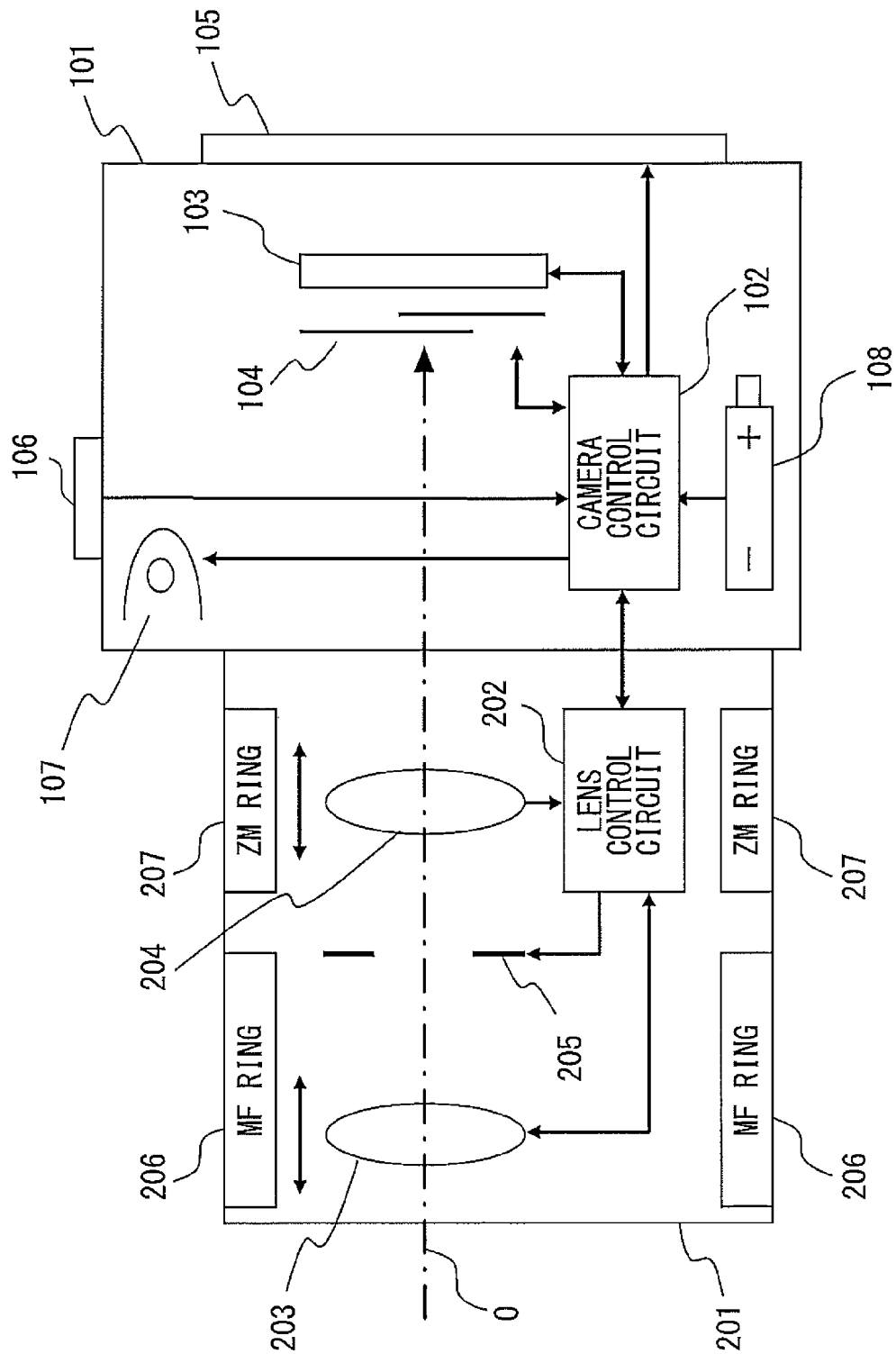
FIG. 1 is a configuration of a camera system according to an embodiment of the present invention.

FIG. 1 is a configuration of a camera system according to the present embodiment. A camera system 1 illustrated in FIG. 1 is a lens-interchangeable camera system, and includes a camera body 101 and an interchangeable lens 201.

The camera body 101 of the camera system 1 illustrated in FIG. 1 is composed of a camera control circuit 102, an imaging element 103, a focal plane shutter 104, a display monitor 105, a flash light emission section 107, and a battery 108. A release button 106 is provided at the upper part of the camera body 101.

The camera control circuit 102 controls the imaging element 103 and the focal plane shutter 104 according to the operation of the release button 106 operated by a photographer who is a user of the camera system 1. The camera control circuit 102 performs a photographing operation by instructing the interchangeable lens 201 to perform various drive controls through a lens control circuit 202 of the interchangeable lens 201. The camera control circuit 102 controls the display of the display monitor 105 according to various operations by the photographer on the camera system 1.

The release button 106 is provided to accept photographing instructions for photometry, autofocusing (AF), exposure, etc. on the camera system 1 provided with the interchangeable lens 201 attached to the camera body 101 according to the operation of the photographer. In the embodiment, a common 2-stage switch is used as the release button 106, and photometry and an autofocusing operation are accepted with a half-depression, and an operation instruction for exposure with a full depression.

The imaging element 103 is composed of a CCD (charge coupled device) sensor, a CMOS (complementary metal-oxide semiconductor) sensor, etc., and photographs a subject formed on the imaging surface by the optical system of the interchangeable lens 201.

The focal plane shutter 104 performs an exposing operation on the imaging element 103 by performing an open/ close operation at an instruction from the camera control circuit 102 described later according to the operation of the release button 106 by the photographer.

The display monitor 105 is composed of liquid crystal, organic EL (electroluminescence), etc., displays a through image etc. in moving image photography, and displays a reproduced image, setting information, etc. according to the operation of a reproduction button not illustrated in FIG. 1 and various setting devices by the photographer.

The flash light emission section 107 performs a light-emitting operation in synchronization with the exposing operation by the focal plane shutter 104 using the electric charge stored in a light-emitting condenser not illustrated in FIG. 1 at an instruction from the camera control circuit 102 in accordance with the operation of the release button 106 by the photographer.

The battery 108 supplies a power source to the camera body 101 and the interchangeable lens 201.

The interchangeable lens 201 is composed of the lens control circuit 202, a focusing lens 203, a zoom lens 204, a diaphragm 205, a focusing ring (MF ring in the attached drawings) 206, and a zoom ring (ZM ring in the attached drawings) 207.

Upon receipt of an instruction from the camera control circuit 102, the lens control circuit 202 performs a control process on each unit of the interchangeable lens 201, such as the drive control of the focusing lens 203, the diaphragm 205, etc.

According to the operation of the focusing ring 206 by the photographer or an instruction from the lens control circuit 202, the focusing lens 203 moves in the direction of the optical axis O, and adjusts the focal state of the interchangeable lens 201. In the autofocusing operation, the lens control circuit 202 performs drive control of the focusing lens 203 at a request from the camera control circuit 102.

According to the operation of the zoom ring 207 by the photographer, the zoom lens 204 moves in the direction of the optical axis O, and changes the focal distance of the interchangeable lens 201.

The diaphragm 205 adjusts the light quantity of a subject taken in the direction of the camera body 101 by changing the area of an aperture according to the operation of a diaphragm ring not illustrated in FIG. 1 by the photographer and an instruction from the lens control circuit 202 at a request from the camera control circuit 102.

Figure 2:
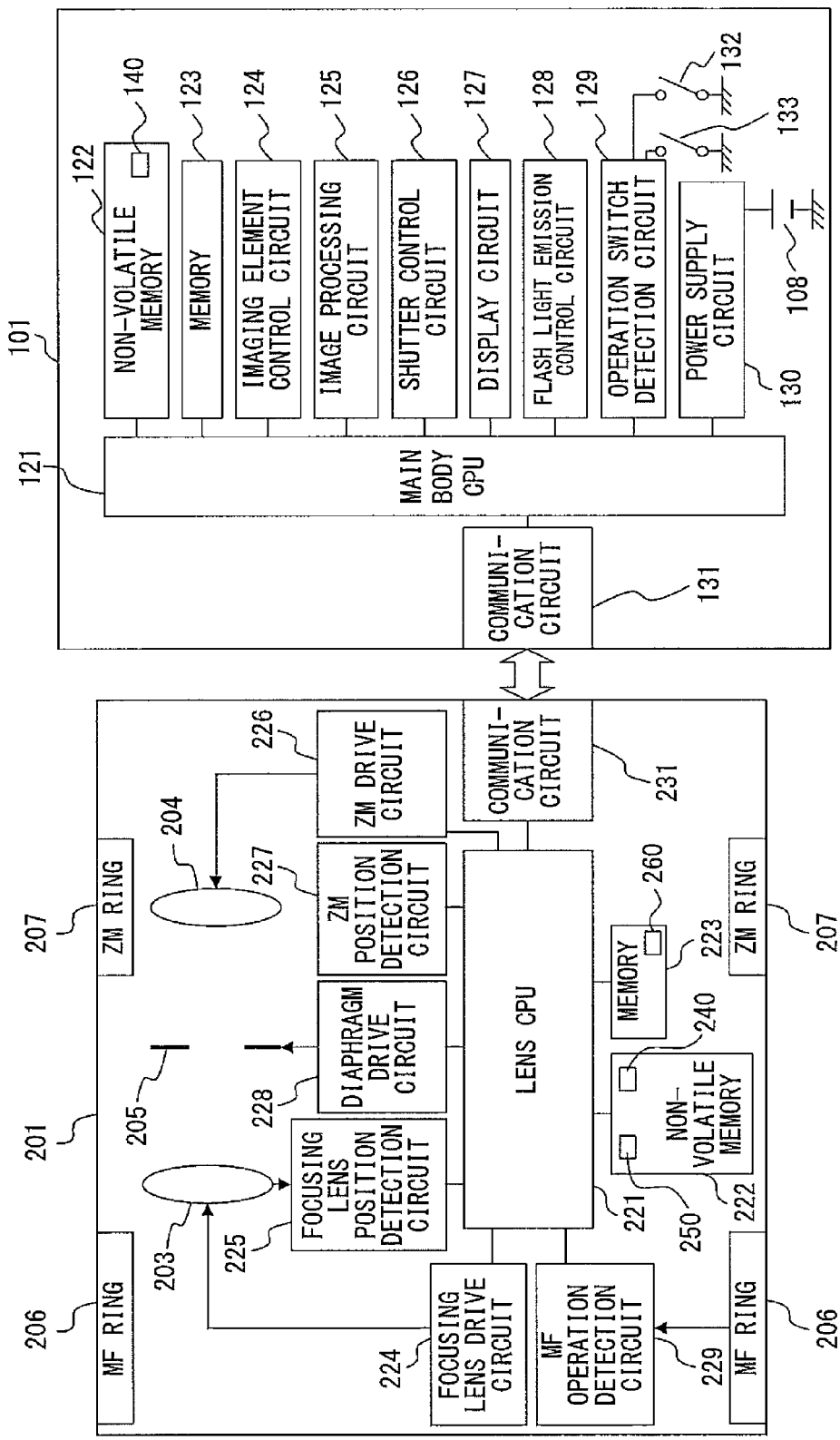
FIG. 2 is a block diagram of an example of a configuration of a control system of a camera system according to an embodiment of the present invention.

FIG. 2 is a block diagram of an example of a configuration of a control system of the camera system 1 according to an embodiment of the present invention.

In the camera system 1 illustrated in FIG. 2, the camera body 101 includes a main body CPU (central processing unit) 121, non-volatile memory 122, memory 123, an imaging element control circuit 124, an image processing circuit 125, a shutter control circuit 126, a display circuit 127, a flash light emission control circuit 128, an operation switch detection circuit 129, a power supply circuit 130, and a camera body communication circuit 131.

The main body CPU 121 controls the entire camera system 1, and communicates with the interchangeable lens 201.

The non-volatile memory 122 is composed of rewritable non-volatile semiconductor memory, etc., and stores a program 140 of the main body CPU 121. By the main body CPU 121 executing the program 140 read from the non-volatile memory 122, the controlling operation on the camera body 101 in the operation illustrated in each flowchart described later is realized.

The memory 123 is composed of semiconductor memory such as RAM (random access memory) etc., and temporarily stores a program and various types of information used by the main body CPU 121.

When the imaging element control circuit 124 controls the frame rate at an instruction from the main body CPU 121, and performs the operations to display a through image and acquire image data for exposure etc. controlling the imaging element 103, the circuit allows the imaging element 103 to perform the photographing operation by converting a subject into an image signal.

The image processing circuit 125 performs necessary image processing such as an A/D conversion, a filtering process, etc., on an image signal output from the imaging element 103, and generates image data to be displayed on the display monitor 105 and image data stored as a photographed image.

The shutter control circuit 126 controls the open/close operation of a focal plane shutter.

The display circuit 127 displays on the display monitor 105 a through image generated by the image processing circuit 125, a photographed image, other types of information, a menu, etc.

The flash light emission control circuit 128 controls charging and light-emitting of the flash light emission section 107.

The operation switch detection circuit 129 detects the operation of the switch, not illustrated in FIGS. 1 and 2, for switching the photographing mode of the camera of the camera body 101 operated by the photographer and the release button 106 illustrated in FIG. 1. For example, the operation switch detection circuit 129 is connected to various operation switches of a first release switch 132, a second release switch 133, etc., and detects each state of the switches.

The first release switch 132 enters an ON state with the half-depression of the release button 106. Upon detection of the ON state of the first release switch 132, the operation switch detection circuit 129 notifies the main body CPU 121 of the detection. When the main body CPU 121 recognizes the ON state of the first release switch 132, it performs a photometry operation and an autofocusing operation.

The second release switch 133 enters an ON state with the full depression of the release button 106. Upon detection of the ON state of the second release switch 133, the operation switch detection circuit 129 notifies the main body CPU 121 of the detection. When the main body CPU 121 recognizes the ON state of the second release switch 133, it performs an exposing operation by opening, closing, etc., the focal plane shutter 104.

The camera body communication circuit 131 is provided to communicate with the lens CPU 221 on the interchangeable lens 201 side, and performs, for example, the process of transmitting a synchronization signal in accordance with the frame rate generated by the control of the main body CPU 121 to the interchangeable lens 201.

The power supply circuit 130 is provided for supplying a power source to each unit of the camera system 1 by smoothing and boosting the voltage of the attached battery 108.

In the camera system 1 illustrated in FIG. 2, the interchangeable lens 201 includes a lens CPU 221, non-volatile memory 222, memory 223, a focusing lens drive circuit 224, a focusing lens position detection circuit 225, a zoom lens drive circuit (a ZM drive circuit in FIG. 2) 226, a zoom lens position detection circuit (a ZM position detection circuit in FIG. 2) 227, a diaphragm drive circuit 228, a focusing ring operation detection circuit (an MF operation detection circuit in FIG. 2) 229, and a lens communication circuit 231.

The lens CPU 221 controls each unit in the interchangeable lens 201 illustrated in FIG. 2 at an instruction from the main body CPU 121. Additionally, the lens CPU 221 transmits the operation state of the interchangeable lens 201, optical data, etc., stored in the non-volatile memory 222, etc., to the main body CPU 121.

The non-volatile memory 222 is composed of rewritable non-volatile semiconductor memory, etc., and stores a program 240 of the lens CPU 221 and lens characteristic data 250. By the lens CPU 221 executing the program 240 read from the non-volatile memory 222, the controlling operation on the interchangeable lens 201 side in the operation exemplified in each flowchart described later is realized. The lens characteristic data 250 is the data indicating the characteristic of the interchangeable lens 201, and includes lens identification data for identification of the model of the interchangeable lens 201, the optical data, which indicates the optical characteristic of the lens, etc.

The memory 223 is composed of semiconductor memory such as RAM, etc., and temporarily stores a program used by the lens CPU 221 and various types of information such as lens state data 260, etc.

The focusing lens drive circuit 224 is composed of an actuator such as a stepping motor or the like, a motor driver or the like, and controls the driving of the focusing lens 203. The focusing lens position detection circuit 225 is composed of a photo-interrupter (PI) circuit, etc., for converting the number of rotations of a driving motor included in the focusing lens drive circuit 224 into the number of pulses. The photo-interrupter circuit expresses the absolute position of the focusing lens 203 on the basis of the infinite far end being the number of pulses. The focusing lens position detection circuit 225 detects the position of the focusing lens 203 driven by the focusing lens drive circuit 224 using the photo-interrupter circuit.

The zoom lens drive circuit 226 is composed of an actuator such as a stepping motor or the like or a motor driver or the like, and controls the driving of the zoom lens 204. The zoom lens position detection circuit 227 is composed of a linear encoder, an A/D conversion circuit, etc. The zoom lens position detection circuit 227 detects the position of the zoom lens 204 driven by the zoom lens drive circuit 226 on the basis of the A/D conversion result of the encoder value.

The diaphragm drive circuit 228 is composed of an actuator such as a stepping motor or the like or a motor driver or the like, and controls the operation of the aperture operation of the diaphragm 205.

The focusing ring operation detection circuit 229 detects the operation of the focusing ring 206 by the photographer.

The lens communication circuit 231 includes a communication connection terminal provided outside the interchangeable lens 201, and is provided for communication with the main body CPU 121 on the camera body 101 side. Specifically, the lens communication circuit 231 performs the process of receiving a drive instruction or the like from the main body CPU 121 for the focusing lens 203, the zoom lens 204, and the diaphragm 205, and the process of transmitting lens position information, the operation state, the lens characteristic data 250, etc., to the main body CPU 121.

The camera system 1 according to the present embodiment illustrated in FIGS. 1 and 2 controls the driving of the interchangeable lens 201 in synchronization with the frame rate of the imaging element 103. The main body CPU 121 of the camera body 101 acquires the lens characteristic data 250 of the optical parameter or the like necessary when the autofocusing operation is performed by the synchronous communication between the camera body 101 and the interchangeable lens 201. The lens characteristic data 250 includes data relating to the communication operation between the camera body 101 and the interchangeable lens 201, such as necessary preparation period, etc., for performing control of the operation of the interchangeable lens 201. The main body CPU 121 of the camera body 101 appropriately determines the frame rate and the synchronous communication period on the basis of the lens characteristic data 250 acquired from the interchangeable lens 201 side, and performs control to transmit a synchronization signal from the camera body communication circuit 131 on the basis of the determined communication period.

Figure 3:
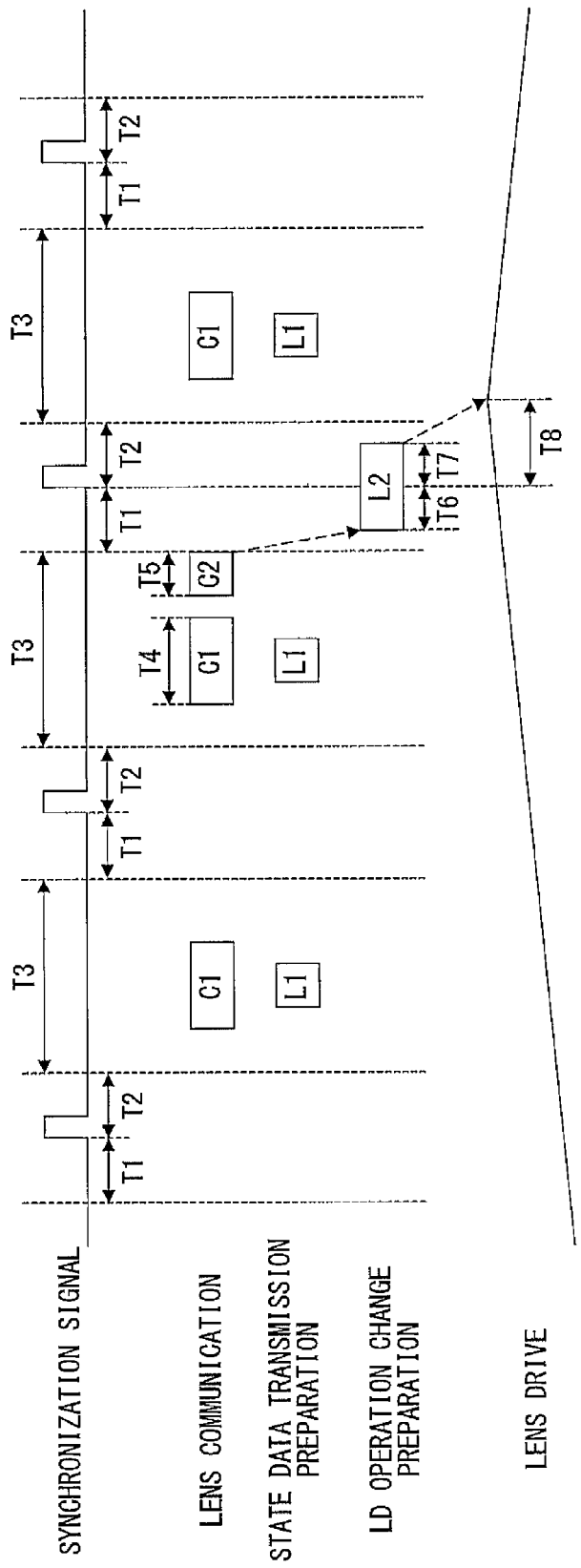
FIG. 3 is a sequence of the communication between the camera body and the interchangeable lens of the camera system according to an embodiment of the present invention.

FIG. 3 illustrates the communication sequence between the camera body 101 and the interchangeable lens 201 of the camera system 1 according to the present embodiment. With reference to FIG. 3, the data relating to the communication operation between the camera body 101 and the interchangeable lens 201 included in the lens characteristic data 250 is concretely described below.

The camera system 1 outputs the synchronization signal at the top in FIG. 3 according to the specified set frame rate. The synchronous period regulated by the synchronization signal includes a communication prohibited period before and after outputting the synchronization signal (the communication prohibited period T1 before outputting the synchronization signal and the communication prohibited period T2 after outputting the signal), and a communication permitted period (T3) in which a communication is allowed.

In the communication permitted period T3, the interchangeable lens 201 performs the process of transmitting necessary information for the driving of the interchangeable lens 201 to the camera body 101 (lens state communication process C1) and the process of the camera body 101 transmitting a drive instruction of the interchangeable lens 201 to the interchangeable lens 201 (drive instruction communication process C2). In the lens state communication process C1, the interchangeable lens 201 transmits the positions of the focusing lens 203 and the zoom lens 204 and the information about the state of the aperture of the diaphragm 205 and the like to the camera body 101. In the drive instruction communication process C2, the camera body 101 transmits the drive instructions of the focusing lens 203, the zoom lens 204, the diaphragm 205, and the like to the interchangeable lens 201 according to the information acquired in the lens state communication process C1.

In the processes, the time T4 required for the lens state communication process C1 includes the necessary time for the lens CPU 221 of the interchangeable lens 201 to detect the states of the focusing lens 203, the zoom lens 204, the diaphragm 205, etc. and prepare data for transmitting to the camera body 101 (hereafter referred to as a state data transmission preparation process L1). Also, relating to the time T5 required for the drive instruction communication process C2, the necessary time is considered for the communication process between the camera body 101 and the interchangeable lens 201.

That is, for the time T4 and T5, the necessary communication time for the standard communication specification specified by the communication standard and the like (for example, the serial communication at the transfer rate of 2 MHz) is set.

In the communication prohibited periods T1 and T2, the lens CPU 221 of the interchangeable lens 201 performs the preparation process for changing the operation state of the focusing lens 203, the zoom lens 204, and the diaphragm 205 (hereafter referred to as an operation change preparation process L2) at the drive instruction received from the camera body 101 at the period T5. The communication prohibited periods (T1 and T2) are determined on the basis of the time (T6+T7) required for the operation change preparation process L2. That is, the operation change preparation process L2 is set not to exceed the communication prohibited periods (T1+T2) and to reach the communication permitted period (T3).

The driving of the interchangeable lens 201 is started if a specified time (T8) has passed with the time required for the operation change preparation process L2 from the output of the synchronization signal taken into account.

The appropriate determination of the frame rate and the synchronous communication period, considering the time T4 required for the lens state communication process C1, the time T5 required for the drive instruction communication process C2, the communication prohibited periods (T1 and T2), etc., is described below in more detail with reference to FIG. 4.

Figure 4:
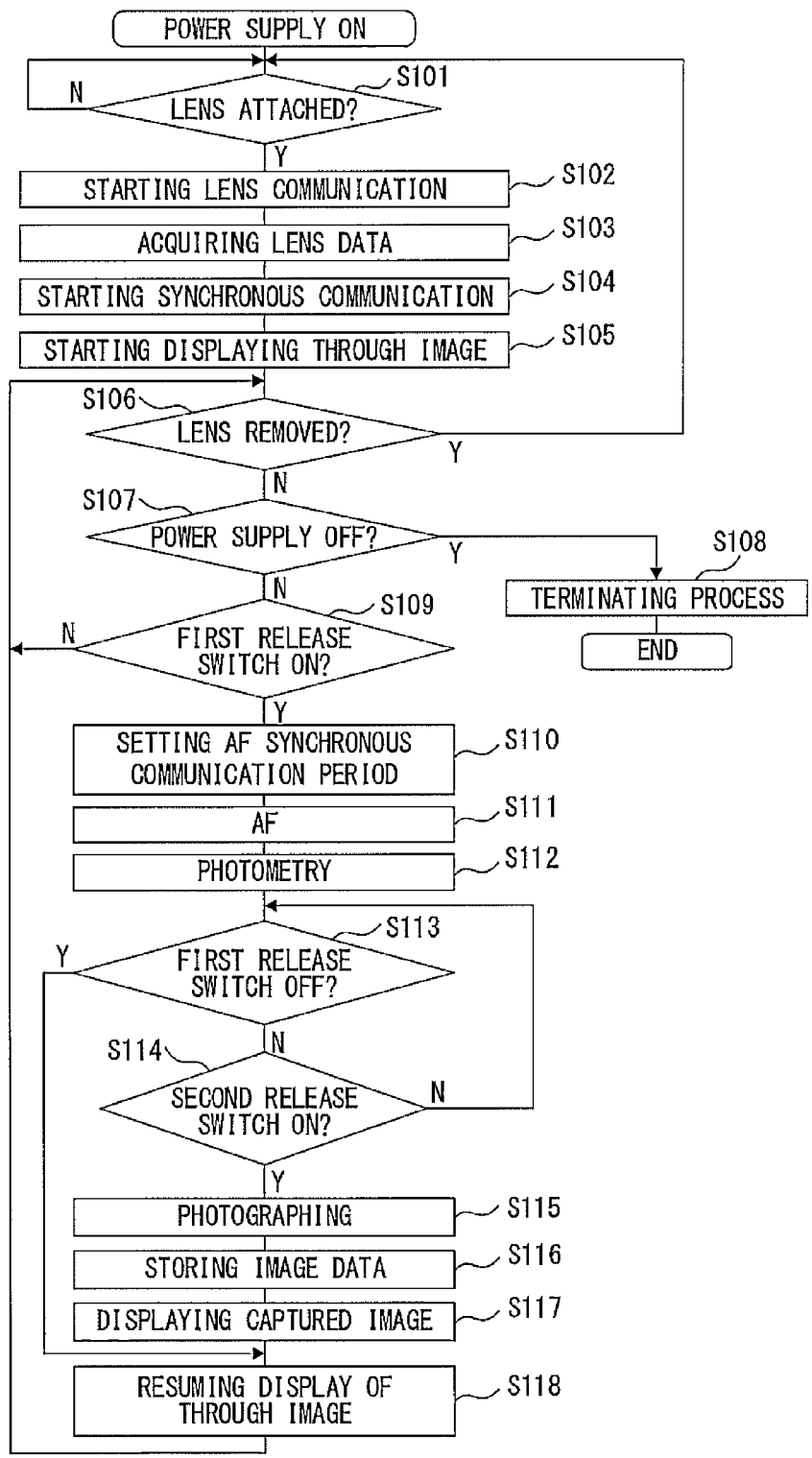
FIG. 4 is a flowchart of an example of a photographing process of a camera system according to an embodiment of the present invention.

FIG. 4 is a flowchart of an example of a photographing process of the camera system 1 according to the present embodiment. The main body CPU 121 of the camera body 101 starts the series of processes illustrated in FIG. 4 when it recognizes that the activating process of the camera system 1 after turning on the camera system 1 is completed.

First, in step S101, the main body CPU 121 judges whether or not the interchangeable lens 201 has been attached. The judgment as to whether or not the interchangeable lens 201 has been attached is performed by the operation switch detection circuit 129 illustrated in FIG. 2 detecting the state of the mount switch, not illustrated in FIG. 2. When the interchangeable lens 201 is attached, control is passed to step S102. When the lens 201 is not attached, a standby operation is periodically performed until the detection of the attachment of the interchangeable lens 201.

In step S102, the main body CPU 121 starts the communication with the lens CPU 221 through the camera body communication circuit 131 and the lens communication circuit 231 to acquire the information relating to the attached interchangeable lens 201.

In step S103, the main body CPU 121 communicates with the lens CPU 221 to acquire the lens characteristic data 250, such as an operation parameter, optical data, etc., and stores the data in the memory 123.

In the present embodiment, the data acquired from the lens CPU 221 in step S103 includes the data about the synchronous communication which starts in the next step S104. Specifically, it includes the communication prohibited periods T1 and T2 before and after the output timing of the synchronization signal, the communication time T4 required for the lens state communication process C1, and the communication time T5 required for the drive instruction communication process C2.

The main body CPU 121 calculates the communication permitted period T3 required in the period of a synchronous communication from the standard communication time T4 and T5 stored in the memory 123 and the processing time by the main body CPU 121. Then, the main body CPU 121 determines the communication period of a synchronous communication from the communication prohibited periods T1 and T2 stored in the memory 123, the calculated communication permitted period T3, and the frame rate of the imaging element 103 which is settable.

For example, assume that each of the communication prohibited periods T1 and T2 is 0.5 ms, the communication times T4 and T5 are 0.5 ms and 0.3 ms respectively, and the frame rate of the imaging element 103 may be set in units of 60 fps up to 540 fps. In this case, the main body CPU 121 selects as a frame rate 480 fps, which is the frame rate of the highest speed in the range of 1 frame including the total time (1.8 ms) of the times T1, T2, T4, and T5, and sets it as one frame (1/480 sec=2.08 ms) synchronous communication period.

Thus, when a synchronous communication period is set, the communication permitted period T3 is 1.08 ms, excluding the communication prohibited periods T1 and T2 (0.5 ms+0.5 ms=1.0 ms) from the communication period (2.08 ms). Afterwards, the main body CPU 121 performs the communication processes C1 and C2 in the obtained communication permitted period T3.

Returning to the explanation with reference to FIG. 4, when the main body CPU 121 sets the synchronous communication period in step S103, it starts the synchronous communication through the camera body communication circuit 131 and the lens communication circuit 231, and enters the synchronous communication mode in step S104. After the synchronous communication is started, the main body CPU 121 acquires the lens state data 260, such as the operation state of the focusing lens 203 and the like of the interchangeable lens 201, and the position of the zoom lens 204 and the like through the lens CPU 221. Then, the main body CPU 121 performs the controlling operation in accordance with the state of the lens indicated by the acquired lens state data 260.

In step S105, the main body CPU 121 operates the imaging element 103 via the imaging element control circuit 124 in each synchronous period, and acquires an imaging signal, which is a photo-electric conversion output of a subject formed on the light-receiving surface. The main body CPU 121 lets the image processing circuit 125 to perform image processing for display of a through image in response to the obtained imaging signal, and to generate display data. The main body CPU 121 starts displaying the through image on the display monitor 105 via the display circuit 127.

In step S106, the main body CPU 121 judges whether or not the interchangeable lens 201 has been attached. The judgment in step S106 is performed in a similar method to that in step S101. When it is judged in step S106 that the interchangeable lens 201 has been removed, control is returned to step S101. When it is judged that the interchangeable lens 201 has been attached, control is passed to step S107.

In step S107, the main body CPU 121 judges whether or not the power supply is turned on. If the power supply is switched from ON to OFF, control is passed to step S108. If the power supply is turned on, control is passed to step S109.

In step S108, the main body CPU 121 performs specified terminating processes such as saving various data in the memory 123, performing a resetting operation, disconnecting a power supply, etc., thereby terminating the process.

In step S109, the main body CPU 121 judges whether or not the first release switch 132 has been turned on. If the first release switch 132 is in the ON state as explained above with reference to FIG. 2, the operation switch detection circuit 129 detects it, and notifies the main body CPU 121 of the state. If the first release switch 132 is turned on, control is passed to step S110. If it is in the OFF state, control is returned to step S106.

In step S110, the main body CPU 121 sets the period of the synchronous communication in the autofocusing operation which is to be performed afterwards. In this embodiment, when the highest speed and an optimum frame rate is set in the preceding step S103, it is not necessary to change the setting of the synchronous communication period. On the other hand, from the time restriction of the communication prohibited periods (T1 and T2), the processing times T4, T5, etc., due to the reduction in power consumption and the like in spite of the current affluence, a low speed frame rate may be set in step S103. In this case, in a similar method to that explained in step S103, the highest speed frame rate is selected, and the setting of the synchronous communication period is changed. Thus, the time required to perform the autofocusing operation to be performed in the following steps is shortened.

In step S111, the main body CPU 121 performs the autofocusing operation. In the present embodiment, the position of the focusing lens 203 when the high-frequency component of an image is the highest is judged according to the imaging signal acquired from the imaging element 103, and the position is detected as a focal position that is a position of the focusing lens focused on a subject, which is a so-called "climbing AF" operation.

Specifically, in the climbing AF, the main body CPU 121 first instructs the lens CPU 221 to start scan driving of the focusing lens 203. An imaging signal is output from the imaging element 103 at the frame rate set in step S110 (or in step S103 when no setting change is made in step S110). The main body CPU 121 performs the process of extracting a high-frequency component of a signal on the imaging signal output from the imaging element 103, and instructs the image processing circuit 125 to calculate an AF evaluation value from the extracted high-frequency component. Additionally, the main body CPU 121 acquires the position information of the focusing lens 203 from the lens CPU 221 in each synchronous period via the synchronous communication in the period set in step S110, and stores in the memory 123 the information associated with the AF evaluation value calculated in each frame. As explained above, the position information about the focusing lens 203 is included in "the lens state data 260". The process of the main body CPU 121 acquiring the data of the position information and the like about the focusing lens 203 from the lens CPU 221 in each synchronous period corresponds "the lens state communication process C1" in FIG. 3.

Thus, the main body CPU 121 judges whether or not the previously acquired AF evaluation value indicates the maximum value each time the AF evaluation value is acquired in each frame. When the previously acquired AF evaluation value indicates the maximum value, the position information about the focusing lens 203 associated with the preceding and subsequent AF evaluation values is read from the memory 123. An interpolation arithmetic is performed using the read position information about the focusing lens 203, thereby calculating the focal position. Then, the main body CPU 121 transmits the focal position information indicating the calculated focal position to the lens CPU 221, and issues an instruction to drive the focusing lens 203 to a specified position. The process of the main body CPU 121 transmitting the focal position information and issuing an instruction to drive the focusing lens 203 to a specified position corresponds to "the drive instruction communication process C2" in FIG. 3.

In the drive instruction communication process C2, the lens CPU 221 which receives a drive instruction of the focusing lens 203 from the main body CPU 121 controls the scan driving of the focusing lens 203 in the specified drive direction and at the specified drive speed. Additionally, the lens CPU 221 instructs the focusing lens position detection circuit 225 to detect the position of the focusing lens 203 at each synchronous period, and transmits the detected position information about the focusing lens 203 to the main body CPU 121. The process of detecting the position of the focusing lens 203 in the focusing lens position detection circuit 225 corresponds to "the state data transmission preparation process L1" in FIG. 3.

Upon receipt of an instruction from the main body CPU 121 to drive the focusing lens 203 to the focal position, the lens CPU 221 instructs the focusing lens drive circuit 224 to stop the scan driving and perform the driving to the specified focal position. The process of the lens CPU 221 set for the driving to the focal position specified by the main body CPU 121 corresponds to "the operation change preparation process L2" in FIG. 3.

Thus, the lens CPU 221 starts driving the focusing lens 203 to the specified position after the passage of a specified time from the time when the synchronization signal immediately after the reception of the instruction to change the driving from the main body CPU 121 is received. The time from the reception of the synchronization signal immediately after the reception of a change instruction from the main body CPU 121 to the start of the driving of the focusing lens 203 to the specified position corresponds to "the time T8" in FIG. 3.

The time T8 is determined by considering the time required for the operation change preparation process L2 (T6+T7) and the time T7 required for the process L2 after the output of the synchronization signal (and the communication prohibited period T2 determined on the basis of the time T7). That is, the time T8 is determined so that it is longer than the time T7 (and T2). By controlling the start of the driving of the focusing lens 203 using the time T8, the operation change preparation process L2 does not interrupt the communication period of the next synchronous period, and the driving of the focusing lens 203 may be started without fail in the next synchronous period.

Returning to the explanation of FIG. 4, the main body CPU 121 instructs the imaging element control circuit 124 to perform photographing on the imaging element 103 in step S112. The main body CPU 121 instructs the image processing circuit 125 to convert the imaging signal output from the imaging element 103 into luminance data, and to perform an exposure arithmetic on the basis of a specified program diagram.

In step S113, the main body CPU 121 judges whether or not the first release switch 132 has entered the OFF state. As with the above-mentioned step S109, the main body CPU 121 makes a judgment on the basis of the detection result of the operation switch detection circuit 129. When the first release switch 132 remains in the ON state, control is passed to step S114. When the first release switch 132 enters the OFF state, no special process is performed, but control is passed to step S118.

In step S114, the main body CPU 121 judges whether or not the second release switch 133 has entered the ON state in addition. Whether the second release switch 133 is in the ON or OFF state is judged by the main body CPU 121 on the basis of the detection result of the operation switch detection circuit 129, as with the first release switch 132. When the second release switch 133 is in the ON state, control is passed to step S115. When the second release switch 133 remains in the OFF state, control is returned to step S113, and the above-mentioned process is repeated until the second release switch 133 is turned on.

In step S115, the main body CPU 121 instructs the lens CPU 221 to drive the diaphragm 205 to a specified diaphragm value on the basis of the result of the exposure arithmetic in step S112. Then, the lens CPU 221 instructs the diaphragm drive circuit 228 to drive the diaphragm 205 to the diaphragm value specified by the main body CPU 121. When the driving process is completed, it notifies the main body CPU 121 of the completion.

Upon receipt of the diaphragm drive completion notification from the lens CPU 221, the main body CPU 121 instructs the shutter control circuit 126 to control the driving of the focal plane shutter 104. The main body CPU 121 instructs the imaging element control circuit 124 to control the imaging element 103, and instructs the image processing circuit 125 to generate imaging data by performing the imaging process for a storage image on the imaging signal output from the imaging element 103.

In step S116, the main body CPU 121 stores the imaging data generated in step S115 in the memory 123 or an external storage device such as a compact flash or the like.

In step S117, the main body CPU 121 instructs the image processing circuit 125 to generate reproduction display data from the imaging data stored in step S116, and instructs the display circuit 127 to display an obtained image on the display monitor 105 on the basis of the generated reproduction display data.

In step S118, the main body CPU 121 resumes the display of the through image on the display monitor 105 as in step S105. The method of displaying a through image on the display monitor 105 is described above in the explanation of step S105. If the settings are changed on the frame rate and the synchronous communication period in step S110, the above-mentioned process is performed after the original values set in step S103 are regained.

Thus, in the camera system 1 according to the present embodiment, the communication prohibited periods (T1 and T2) and the communication process times (T4 and T5) appropriate for each interchangeable lens 201 are stored in the non-volatile memory 222. When the main body CPU 121 of the camera body 101 controls the driving of the interchangeable lens 201, such as an autofocusing operation or the like, determination is performed using the information acquired from the non-volatile memory 222 in the communication with the interchangeable lens 201, that is, using the lens characteristic data 250. The lens characteristic data 250 is set in accordance with the characteristic of each type of interchangeable lens 201. By determining the frame rate and the synchronous communication period using the lens characteristic data 250, the camera system 1 may control the operation of the interchangeable lens 201, such as an autofocusing operation or the like, at the optimum frame rate and in the synchronous communication period. That is, in the frame rate and the synchronous communication period, an appropriate value is set by considering the necessary time for the preparation of the driving of the interchangeable lens 201 (operation change preparation process L2) and the like. Therefore, the operation change preparation process L2 is performed without fail in the communication prohibited period without interrupting the communication period of the next synchronous period, and the driving of the interchangeable lens 201 may be started without fail in the next synchronous period in which the process is performed.

When a higher speed frame rate of an imaging element and a shorter synchronous communication period are used to speed up the autofocusing operation, the rate of the above-mentioned preparation period in the synchronous period increases. In this case, if the consideration is not satisfactory about the preparation period, the time required for the process including the preparation period interrupts the synchronous period. Thus, the state change in the next period of the time when the drive control instruction is received from the camera body does not occur in time. Alternately, there occurs a problem such as that a communication between the camera body and the interchangeable lens is not performed in the next period. However, according to the present embodiment, control is performed at the optimum frame rate and in the synchronous communication period in accordance with the characteristic of the interchangeable lens attached to the camera body.

First Variation Example

In the above-mentioned embodiment, a so-called climbing AF is adopted as an autofocusing system. That is, in the above-mentioned embodiment, the position in which the high-frequency component of the signal of the subject acquired from the imaging element 103 at a specified frame rate indicates the maximum value is detected as a focal position while driving the focusing lens 203 in the climbing AF. However, the present embodiment is not limited to this application. The present variation example is different in that a method other than the above-mentioned method is used.

The difference between the present variation example and the above-mentioned embodiment is mainly described below. Since the configuration of the camera system according to the present variation example, the communication sequence between the camera body and the interchangeable lens, and the photographing process of the camera system are similar to those explained above as illustrated in FIGS. 1 through 4, the explanation is omitted here.

FIG. 5 is an explanatory view of the autofocusing system adopted in the present variation example. As illustrated in FIG. 5, a focus detection pixel photoreception unit 150 is provided at the position shifted from the microlens optical axis of an imaging element.

In the present variation example, the focal position is detected by the imaging plane phase difference system. Specifically, the focal position is obtained by acquiring a pupil-split subject via a focus detection pixel of the focus detection pixel photoreception unit 150, and the defocus amount is obtained by the parallax, thereby obtaining a focal position. Since the imaging plane phase difference AF is a well-known technique, the detailed explanation is omitted here.

The settings of the imaging frame rate and the synchronous communication period according to the present variation example are described below. The present variation example is an example of a consecutive photographing operation in a continuous AF mode (hereafter referred to as continuous AF consecutive photographing), and the imaging frame rate and the synchronous communication period in the continuous AF consecutive photographing operation aim at a high-speed process so as to improve the consecutive photographing speed and the moving object prediction AF accuracy.

Figure 6:
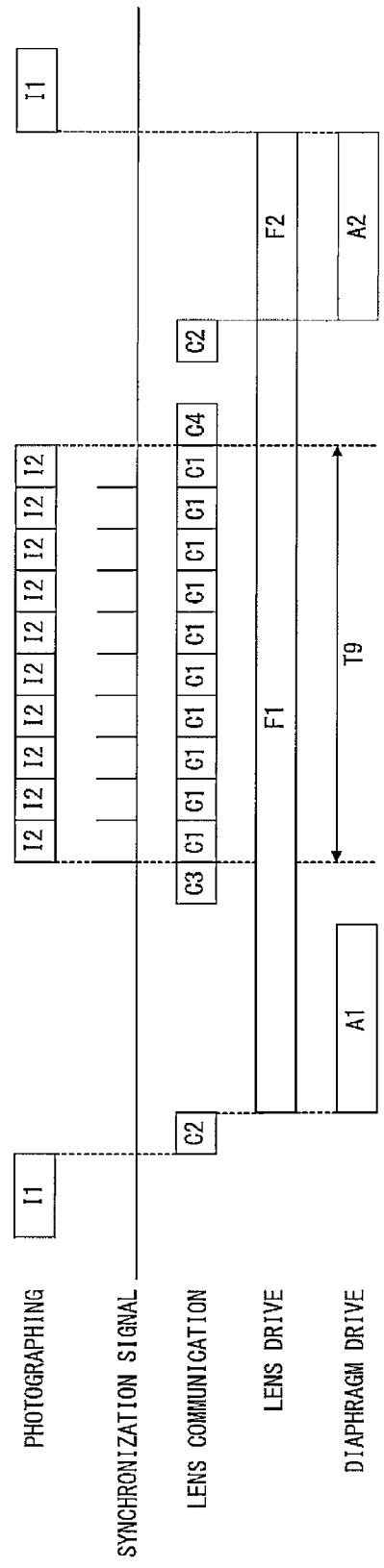
FIG. 6 illustrates a communication sequence between the camera body and the interchangeable lens of the camera system according to the first variation example.

As illustrated in FIG. 6, in the continuous AF consecutive photographing operation, among imaging frames illustrated in an imaging operation I1, an asynchronous communication state is transferred to a synchronous communication state T9 by a synchronous communication start communication process C3 after a diaphragm open drive process A1 in accordance with the drive instruction communication process C2 of the main body CPU 121. Then, the main body CPU 121 repeatedly performs a ranging imaging process I2 and the lens state communication process C1, acquires the defocus amount by the ranging imaging process I2, and acquires the position of the focusing lens 203 from the lens CPU 221 by the lens state communication process C1. Then, after the above-mentioned operation is performed a specified number of times, the synchronous communication state T9 is terminated by a synchronous communication end communication process C4. The moving object tracking drive process of driving the focusing lens 203 at a speed specified by the main body CPU 121 on the basis of the previous moving object prediction result is indicated by F1.

After the completion of the synchronous communication state T9, the main body CPU 121 performs a moving object prediction arithmetic on the basis of the defocus amount and the position of the focusing lens 203, which are acquired in the ranging imaging process 12 and the lens state communication process C1. Then, the driving of the focusing lens 203 to the calculated predicted focal position is specified by the drive instruction communication process C2. The driving of the diaphragm 205 to the diaphragm control position obtained from the ranging imaging data etc. is also specified by the drive instruction communication process C2. Next, the lens CPU 221 performs a predicted focal drive process F2 to the specified position of the focusing lens 203. Furthermore, the lens CPU 221 performs a diaphragm drive process A2 to the specified position of the diaphragm 205.

In the synchronous communication in the continuous AF consecutive photographing operation illustrated in FIG. 6, a change is made to the setting of not providing the communication prohibited periods T1 and T2 illustrated in FIG. 3. Then, in the synchronous communication period, only the lens state communication process C1 of transmitting lens state data from the lens CPU 221 to the main body CPU 121 is performed, and the drive instruction communication process C2 from the main body CPU 121 is not performed. Thus, the synchronous communication period is set only in accordance with a communication time T4 required for the lens state communication process C1. Thus, in the continuous AF consecutive photographing operation set in the continuous AF mode and the consecutive photographing mode, the communication operation is performed at a higher speed than in other operation modes by shortening the synchronous communication period. When the synchronous communication period during imaging standby or 1R on is, for example, 240 Hz, a setting change is made to double it, that is, a synchronous communication period of 480 Hz in the consecutive photographing operation.

When the imaging plane phase difference AF is adopted as in the present variation example, the state acquisition of the interchangeable lens 201 may be performed at a high speed by changing the communication method in the above-mentioned method when performing motion tracking, thereby improving the consecutive photographing speed and the moving object prediction AF accuracy.

Second Variation Example

In the above-mentioned embodiment, the data indicating the communication prohibited periods (T1, T2) in which a communication from the interchangeable lens 201 to the camera body 101 is prohibited and the communication process time (T4, T5) is stored in the interchangeable lens 201, and the data stored in the camera body 101 are transmitted. However, the present invention is not limited to this application. In the present variation example, the information about the time in a specified range is stored in the interchangeable lens 201, and when the camera body 101 acquires the information from the interchangeable lens 201, the communication prohibited period etc. is determined on the basis of the information.

FIG. 7 is an example of the data structure of the communication prohibited period in the lens data 250 according to the present variation example. As illustrated in FIG. 7, according to the present variation example, the communication prohibited period is data including a range, and is associated with the communication prohibited period data for identification of each piece of data.

According to the present variation example, when the lens CPU 221 of the interchangeable lens 201 transmits the lens characteristic data 250 in step S103 in FIG. 4 to the main body CPU 121 of the camera body 101, it transmits the communication prohibited period data illustrated in FIG. 7 as the information indicating the communication prohibited period. The memory 123 of the camera body 101 stores a table illustrated in FIG. 7 in advance. The main body CPU 121 of the camera body 101 reads the communication prohibited period corresponding to the received communication prohibited period data from the memory 123, and may set a specified value from among the periods including the read range as a communication prohibited period (T1, T2). Thus, while reducing the communication amount between the camera body 101 and the interchangeable lens 201, a more appropriate value may be selected in accordance with the state and the like from the information about the time including a range. For example, when the consecutive photographing speed is high in the consecutive photographing, the minimum value of the range is adopted, the time value is assigned to other processes, thereby optimizing the entire process.

Alternately, as another variation example, the lens CPU 221 of the interchangeable lens 201 may be configured to transmit the right column in FIG. 7, that is, the communication prohibited period including a range itself, to the main body CPU 121 of the camera body 101.

In FIG. 7, the communication prohibited period is exemplified, but the present invention is not limited to the example, and the communication time T4, T5, etc. may have similar configurations. As with the present variation example, a similar effect as the above-mentioned embodiment may be obtained by the configuration including a time range for the lens characteristic data 250.

The present invention is not limited to the above-mentioned embodiment as is, but may be embodied by varying the component within the gist of the present invention. Furthermore, various inventions may be formed by appropriately combining a plurality of components disclosed in the above-mentioned embodiment. For example, all components in the embodiment may be appropriately combined. Furthermore, the components of different embodiments may be appropriately combined. It is obvious that variations and applications may be used within the gist of the present invention.

What is claimed is:

1. A camera system having an interchangeable lens and a camera body from which the interchangeable lens can be removed, wherein:
   the interchangeable lens comprises:
      a storage unit which stores data relating to a communication operation between the interchangeable lens and the camera body; and
      a lens control unit which communicates with the camera body, and controls an operation of the interchangeable lens at a control instruction from the camera body;

the camera body comprises:
- an imaging unit which photographs a subject on an imaging element by using the interchangeable lens at a specified frame rate and generates image data;
- a body control unit which communicates with the lens control unit and controls an operation of the camera body; and
- a timing signal transmission unit which transmits a timing signal at the frame rate to the lens control unit under control of the body control unit;

the body control unit acquires data relating to a communication operation stored in the storage unit via a communication with the lens control unit, determines a transmission period of the timing signal according to the acquired data, and controls the timing signal transmission unit on the basis of the determined transmission period, wherein data relating to the communication operation is related to a period in which a communication is prohibited in a period of the timing signal, and wherein
the period in which the communication is prohibited is provided before and after a time in which the timing signal is transmitted.

2. The system according to claim 1, wherein:
the body control unit starts operation control of the interchangeable lens after a passage of a specified period from a time in which the timing signal is transmitted; and
the specified period is set on the basis of a time required for a preparation process for changing an operation state of the interchangeable lens.

3. A camera system having an interchangeable lens and a camera body from which the interchangeable lens can be removed, wherein:
the interchangeable lens comprises:
- a storage unit which stores data relating to a communication operation between the interchangeable lens and the camera body; and
- a lens control unit which communicates with the camera body, and controls an operation of the interchangeable lens at a control instruction from the camera body;

the camera body comprises:
- an imaging unit which photographs a subject on an imaging element by using the interchangeable lens at a specified frame rate and generates image data;
- a body control unit which communicates with the lens control unit and controls an operation of the camera body; and
- a timing signal transmission unit which transmits a timing signal at the frame rate to the lens control unit under control of the body control unit;

the body control unit acquires data relating to a communication operation stored in the storage unit via a communication with the lens control unit, determines a transmission period of the timing signal according to the acquired data, and controls the timing signal transmission unit on the basis of the determined transmission period, wherein data relating to the communication operation is related to a time required for a communication of a control instruction transmitted from the body control unit to the lens control unit, and wherein
a time required for a communication of the control instruction is set so that a time required for a process of the interchangeable lens control unit transmitting necessary information for driving of the interchangeable lens to the body control unit, and a time required for a process of the body control unit transmitting a drive instruction of the interchangeable lens to the lens control unit may be included in a period in which a communication between the camera body and the interchangeable lens is permitted.

* * * * *